United States Patent
Furlong

[15] 3,703,139
[45] Nov. 21, 1972

[54] PRESSURE CONTROL SYSTEMS

[72] Inventor: Owen Desmond Furlong, East Coker, England

[73] Assignee: Westland Aircraft Limited, Yeovil, Somerset, England

[22] Filed: Nov. 10, 1970

[21] Appl. No.: 88,402

[30] Foreign Application Priority Data

Dec. 9, 1969   Great Britain..........56,776/69

[52] U.S. Cl.....................................98/1.5, 137/608
[51] Int. Cl. .............................................B64d 13/04
[58] Field of Search ...............98/1.5; 137/608, 612.1

[56] References Cited

UNITED STATES PATENTS

| 3,450,020 | 6/1969 | Andreson | 98/1.5 |
| 3,362,424 | 1/1968 | Smith | 98/1.5 |
| 3,376,802 | 4/1968 | Emmons | 98/1.5 |

Primary Examiner—Meyer Perlin
Attorney—Larson, Taylor & Hinds

[57] ABSTRACT

A fluid pressure controller or emergency pressure controller comprises changeover valve means for substitution of the controller for normal control means and isolation thereof, pressure reducing means for regulating supply pressure through the controller to a pneumatically operable pressure varying means for an enclosure, and controllable valve means for controlling the output pressure from the controller. The controllable valve means may be a bleed valve, settable either manually or by a pressure capsule responsive to pressure in the enclosure. Preferably the normal control means is a fluidic pressure control system for the enclosure, and the fluid pressure controller functions as a selectively operable override controller during emergency conditions, such as upon malfunction of the normal control means.

14 Claims, 2 Drawing Figures

PRESSURE CONTROL SYSTEMS

This invention relates to fluid pressure control systems, and more specifically to fluid pressure controllers for use in conjunction with fluid pressure control systems or in conjunction with rate of environmental change sensing devices connected into fluid pressure control systems, as emergency controllers for controlling the pressure of an enclosed space in the event of control system failure.

Fluid pressure control systems and rate of environmental change sensing devices for use in fluid pressure control systems such as described in U.S. Pat. No. 3,559,559, are, as are all systems, subject to breakdown. Rare though these breakdowns may be, a breakdown in an aircraft cabin at altitude could be disastrous unless an emergency means of controlling pressure, and the rate of change thereof, within the cabin existed. Basically with these systems pressure increasing and pressure decreasing means, actuated by fluid pressure from a power relay within the system, open or close vents in the cabin wall to maintain the pressure within the cabin at a preselected value and at the same time ensure that the rate of change of pressure within the cabin is kept within prescribed limits.

It is an object of this invention to provide a fluid pressure controller for use in conjunction with a fluid pressure control system, such as described above, to operate, when selected, as an emergency override controller operable to manually control fluid pressure from a power source to the pressure increasing and pressure decreasing means within the fluid pressure control system should malfunction of the system occur, and isolate the power output of the normal fluid pressure control system.

It is a further object of this invention to provide a fluid pressure controller for use in conjunction with a fluid pressure control system, such as described above, to operate, when selected, as an emergency override controller operable to automatically control fluid pressure from a power source to the pressure increasing and pressure decreasing means within the fluid pressure control system to maintain the pressure within the enclosure at a preselected value should malfunction of the normal fluid pressure control system occur, and isolate the power output of the normal fluid pressure control system.

These and further objects, features and advantages of the invention will become apparent to those skilled in the art from the ensuing description of preferred embodiments taken in conjunction with the appended drawings.

The override system which is the subject of the present invention is shown diagrammatically in the appended formal drawings, in which.

Figure 1:
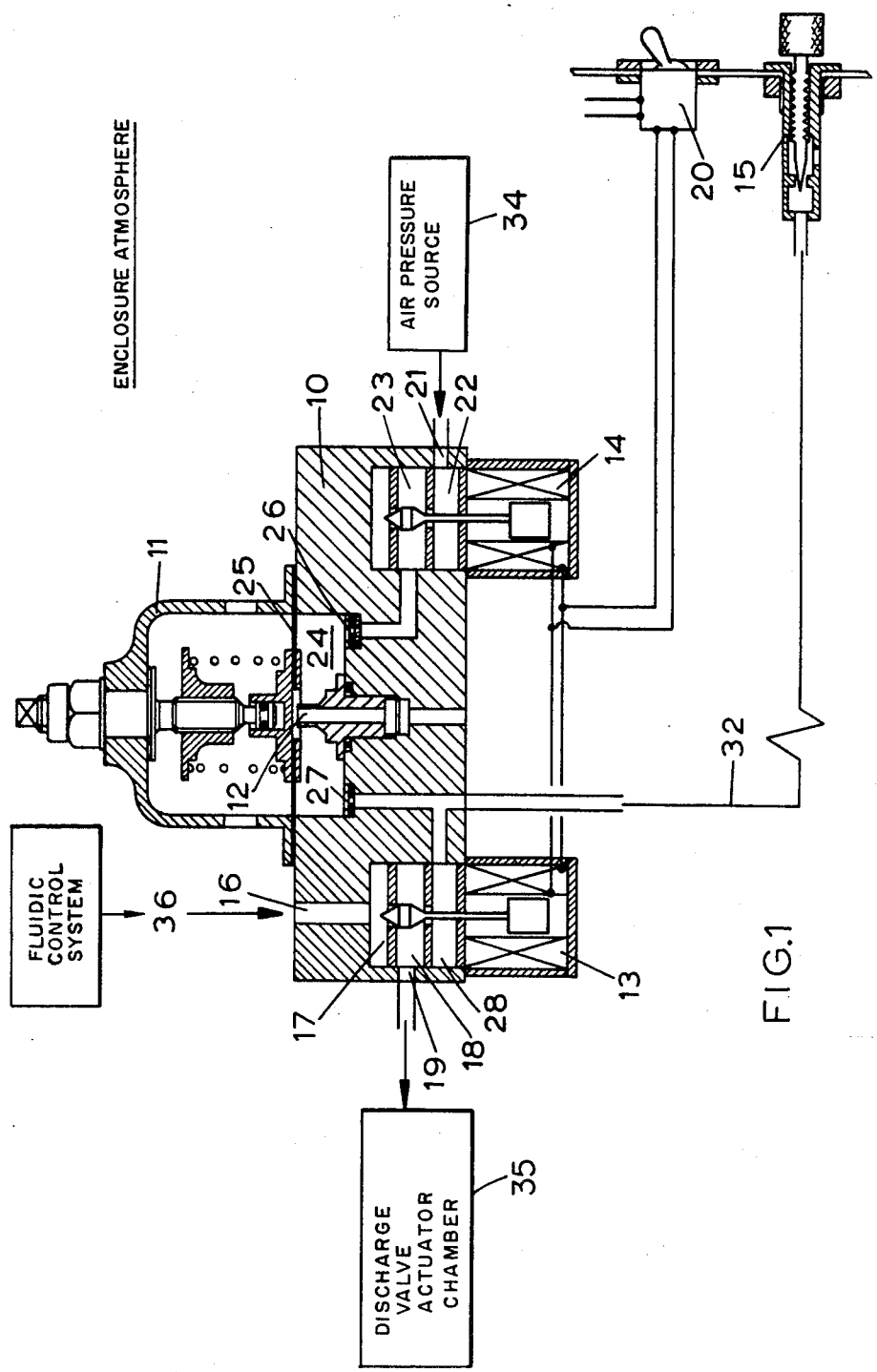
FIG. 1 shows a manually operated override circuit.

The system will now be described as follows:

In FIG. 1 the override system is shown as an operational module 10 incorporating a pressure relief valve 11, a diaphragm actuated pad valve assembly 12, a pair of electromagnetic solenoid valves 13 and 14, and a manually controlled altitude selector 15, positioned remote from but connected to the operational module 10.

When the general fluidic system is operating under normal control conditions the pressure controller output signal 36 in the form of a flow of power fluid enters the module via port 16 to pass unobstructed through chambers 17 and 18 of solenoid valve 13, and out of port 19 into the discharge valve actuator chamber 35 (not shown).

When an emergency condition exists, switch 20 will cause the energization of both solenoid valves 13 and 14 to the position shown in FIG. 1. Air, at a constant supply pressure above atmospheric, is tapped from a source 34, which could be an aircraft engine or an independent compressor, and enters the module via port 21. Passing through the now open solenoid valve 14 via chambers 22 and 23, it causes a pressure rise in chamber 24 below diaphragm 25, this pressure being controlled by resistors (restricting orifices) 26 and 27 and pad valve 12. Any excess pressure will be bled by this pad valve. The output from chamber 24 is via the orifice of resistor 27, and is pressure regulated by the manually actuated altitude selector 15. This is shown as a simple screw-type needle valve which provides an adjustable bleed of pressure to ambient or the enclosure, and the setting chosen will decide the amount by which the discharge valve will open. This now reduced pressure will pass through chambers 28 and 18 of solenoid valve 13 and via control port 19 to the discharge valve actuator chamber 35.

The system of FIG. 1, therefore, provides an emergency manual selection override control, which may be switched in to interrupt the normal pressurization control system, and enable an enclosure pressure to be maintained at a preselected level.

Figure 2:
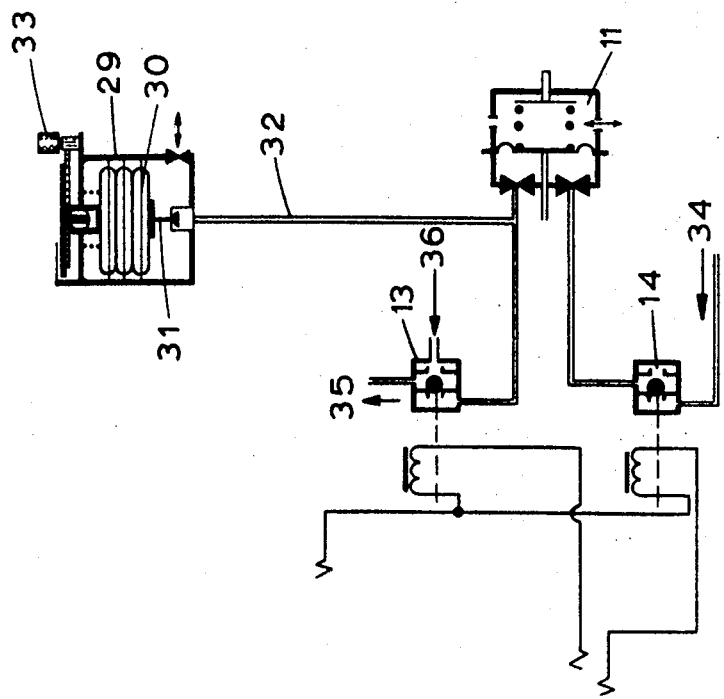
FIG. 2 shows a similar circuit to that in FIG. 1, incorporating an emergency altitude selector.

In the system shown diagrammatically by FIG. 2, the altitude selector 15 of FIG. 1 has been replaced by an automatic capsule actuated emergency altitude selector 29.

This selector comprises a sealed capsule 30 responsive to external pressure variations which co-operates with a pad valve assembly 31 to bleed control fluid to a lesser or greater extent from control line 32, as did the simple needle valve of the altitude selector 15 of FIG. 1. The required altitude at which the enclosure pressure is to be maintained can be set by control knob 33, which repositions the capsule to open pad valve assembly 31 at the selected altitude or pressure. On attainment of the selected altitude pad valve assembly 31 opens and bleeds fluid from line 32, thereby controlling fluid pressure output from control port 19 to the discharge valve actuator chamber 35 as shown in FIG. 1. Should malfunction of the fluidic control system occur at an altitude in excess of that selected on control knob 33, enclosure pressure controlled by the fluidic control system would be approximately that selected on control knob 33, so transition from normal control to emergency override control on solenoid energization would be comparatively smooth. Capsule 30 via pad valve assembly 31 and module 10 would then maintain the enclosure pressure at the selected altitude. Should malfunction of the fluidic control system occur at an altitude below that selected on control knob 33 then the capsule 30 would operate pad valve assembly 31 if and when the enclosure pressure became the equivalent or less than the pressure of the selected altitude.

To suit various other circuit requirements, in the place of the solenoid valves and the electric circuit disclosed above, pneumatically operated valves and an isolating switch could be used. A negative feedback damping system may be required to overcome stability problems. Also, if the emergency override system could be switched on automatically by an altitude switch during rapid depressurization conditions, as well as when required by a manually operated switch, and the response can be made fast enough, it could effectively cancel the need for an emergency pressure controller. This circuit could, of course, be workable using either electric or pneumatic components, and bistable fluidic amplifier elements could be used to hold the control at selected altitudes below that at which an altitude switch might break contact, and a warning light or indicator would be an essential requirement.

I claim as my invention:

1. In an enclosure pressure control system having pneumatically operable pressure varying means for the enclosure and a fluidic control system for operating said pressure varying means in accordance with fluidic signals from the fluidic control system, an override pressure controller comprising passage means adapted to communicate a pressure fluid source with said pressure varying means, valve means for normally closing communication between said pressure fluid source and said pressure varying means and opening communication between said fluidic control system and said pressure varying means but movable to a second state to close communication between said fluidic control system and said pressure varying means and open communication between said pressure fluid source and said pressure varying means, and selectively adjustable valve means for reducing and controlling the pressure in said passage means from said pressure fluid source proportionally with the setting of said selectively adjustable valve means when said valve means opens communication between said pressure fluid source and said pressure varying means.

2. Apparatus as claimed in claim 1 wherein said pressure fluid source is above atmospheric pressure, and said selectively adjustable valve means comprises a bleed valve.

3. Apparatus as claimed in claim 2 wherein said bleed valve is adjustable automatically by a settable pressure capsule responsive to pressure in the enclosure.

4. Apparatus as claimed in claim 2 wherein said bleed valve is manually adjustable.

5. Apparatus as claimed in claim 2 further comprising a relief valve in said passage between said pressure fluid source and said pressure varying means.

6. Apparatus as claimed in claim 1 wherein said valve means are selectively energizable electrically to move from the normal state to the second state.

7. Apparatus as claimed in claim 1 wherein said valve means comprise first and second valves, said first valve having a normal state in which it opens communication between said fluidic control system and said pressure varying means and closes the upstream portion of said passage, and a second state in which it opens said passage and closes communication of said fluidic control system with said pressure varying means, said second valve being located in said passage upstream from said first valve and having a normal state in which it closes said passage and a second state in which it opens said passage, and further comprising means for simultaneously moving said first and second valves from said normal states to said second states, and vice versa.

8. Apparatus as claimed in claim 7 wherein said selectively adjustable valve means is a bleed valve communicating with said passage means between said first and second valves.

9. Apparatus as claimed in claim 8 further comprising a pressure relief valve communicating with said passage between said first and second valves.

10. Apparatus as claimed in claim 9 wherein said first and second valves are actuated by commonly energized solenoids.

11. A fluid pressure controller for use in a pressure control system of the type wherein a fluidic control system passes variable pressure fluid to a pneumatically operated pressure varying means to control the pressure in an enclosure, comprising first passage means adapted to fluidly communicate the pressure varying means and the fluidic control system for normal control of the pressure varying means, second passage means adapted to fluidly communicate a fluid pressure source with the pressure varying means, valve means selectively positionable to open said first passage means and close said second passage means, or vice versa, but normally opening said first passage means and closing said second passage means, and settable valve means fluidly communicating with said second passage means for proportionally reducing and controlling the pressure of fluid therein when said second passage means is open.

12. Apparatus as claimed in claim 11 wherein said selectively positionable valve means are remotely positionable electrically.

13. Apparatus as claimed in claim 12 wherein said selectively positionable valve means comprise first and second valves, the first of which controls both of said passages by opening one when closing the other, and the second of which opens and closes said second passage upstream of said first valve.

14. Apparatus as claimed in claim 13 wherein said settable valve means is a bleed valve fluidly communicating with said second passage means between said first and second valves, and further comprising relief valve means in said second passage means between said first and second valve means.

* * * * *